(12) United States Patent
Maeda

(10) Patent No.: US 7,262,683 B2
(45) Date of Patent: Aug. 28, 2007

(54) SYSTEM FOR CONTROLLING STARTING AND STOPPING OF ENGINE

(75) Inventor: Toru Maeda, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 310 days.

(21) Appl. No.: 10/899,490

(22) Filed: Jul. 26, 2004

(65) Prior Publication Data
US 2005/0023902 A1    Feb. 3, 2005

(30) Foreign Application Priority Data
Jul. 28, 2003    (JP)    ............... 2003-202429

(51) Int. Cl.
G05B 19/00 (2006.01)
G06F 7/00 (2006.01)
G06K 19/00 (2006.01)
G08B 13/00 (2006.01)
H04B 1/00 (2006.01)

(52) U.S. Cl. ................. 340/5.31; 340/5.7; 340/3.7

(58) Field of Classification Search ........ 340/5.3–5.32, 340/825.36, 5.61, 3.7, 426.12, 426.3, 438, 340/686.1; 70/278.1, 278.3, 409
See application file for complete search history.

(56) References Cited

U.S. PATENT DOCUMENTS

| | | | | | |
|---|---|---|---|---|---|
| 3,086,675 | A | * | 4/1963 | Clark, Jr. ................ | 220/238 |
| 4,898,010 | A | * | 2/1990 | Futami et al. ............. | 70/278.1 |
| 5,696,679 | A | * | 12/1997 | Marshall et al. ............. | 701/53 |
| 5,801,614 | A | * | 9/1998 | Kokubu .................... | 340/425.5 |
| 5,982,295 | A | * | 11/1999 | Goto et al. .............. | 340/10.52 |
| 6,047,343 | A | * | 4/2000 | Olarig ........................ | 710/302 |
| 6,169,650 | B1 | * | 1/2001 | Albrecht ..................... | 361/171 |
| 6,191,703 | B1 | * | 2/2001 | Wallace .................. | 340/825.69 |
| 6,573,615 | B1 | * | 6/2003 | Asakura et al. .............. | 307/9.1 |
| 7,023,318 | B1 | * | 4/2006 | Geiger et al. .............. | 340/5.31 |

FOREIGN PATENT DOCUMENTS

| JP | 2001-289142 | 10/2001 |
|---|---|---|
| JP | 2001-311333 | 11/2001 |

\* cited by examiner

Primary Examiner—Brian Zimmerman
Assistant Examiner—Nam Nguyen
(74) Attorney, Agent, or Firm—Crompton, Seager & Tufte, LLC

(57) ABSTRACT

A system for controlling starting and stopping of an engine that prevents a user from erroneously determining that the system is not functioning properly. The system includes an electronic key that may be inserted in a socket. The key selectively transmits a key ID code and a key transponder code to the vehicle. A microcomputer installed in the vehicle checks whether the key ID code matches a vehicle ID code when the key is arranged in the vehicle and checks whether the key transponder code matches a vehicle transponder code when the key is inserted in the socket. The microcomputer enables the starting of the engine and selectively interlocks the key inserted in the socket in accordance with the checking results. First and second display lamps notify the user whether the key is removable from the socket in accordance with the operation of the microcomputer.

7 Claims, 2 Drawing Sheets

SYSTEM FOR CONTROLLING STARTING AND STOPPING OF ENGINE

BACKGROUND OF THE INVENTION

The present invention relates to an engine start/stop system for controlling starting and stopping of a vehicle engine, and more particularly, to an engine start/stop system including an electronic key that communicates with a vehicle.

In addition to improving basic performance and safety, vehicles such as automobiles are now also required to improve operating convenience. Japanese Laid-Open Patent Publication Nos. 2001-289142 and 2001-311333 each describe a system for controlling the starting and stopping of an engine provided with a smart ignition function to improve operating convenience. In such a type of an engine control system, when a user (driver) carrying an electronic key enters the vehicle, the electronic key automatically communicates with a controller, which is arranged in the vehicle. During the communication, the electronic key transmits an ID code to the vehicle. The controller in the vehicle then determines whether the ID code of the electronic key matches an ID code that is unique to the vehicle (smart ID authentication). When the ID code of the electronic key matches the ID code of the vehicle, the controller enables the starting and stopping of the engine. The user then operates a push button, which is located in the passenger compartment, to start or stop the engine. In other words, the user may start or stop the engine just by entering the vehicle and operating the push button.

In the above engine control system, the smart ID authentication is not performed when, for example, the battery of the electronic key is drained or when a communication anomaly occurs. To cope with such problems, the engine control system performs transponder ID authentication instead of smart ID authentication. More specifically, the electronic key includes a transponder. When the user inserts the electronic key into a key socket located in the instrument panel, induced electromotive force is generated in the transponder. The transponder uses the induced electromotive force to transmit a transponder signal, which includes a transponder code, to the controller in the vehicle. The controller then determines whether the transponder code of the electronic key matches a transponder code that is unique to the vehicle (transponder ID authentication). When the transponder code of the electronic key matches the transponder code of the vehicle, the controller enables the starting of the engine and validates the operation of the push button.

In the prior art system described above, when transponder ID authentication is performed, an interlock device interlocks the electronic key so that it cannot be removed from the key socket. However, when smart ID authentication is performed, the interlock device does not interlock the electronic key even when the user inserts the electronic key in the key socket for one reason or another. Thus, the user can remove the electronic key from the socket. In this manner, the electronic key is removable from the key socket in some cases and not removable from the key socket in other cases. This may result in the user erroneously determining that the system is not functioning properly.

SUMMARY OF THE INVENTION

The present invention provides a system for controlling starting and stopping of an engine that prevents a user from erroneously determining that the system is not functioning properly.

One aspect of the present invention is a system for controlling starting and stopping of an engine mounted on a vehicle for use by a user. The vehicle is provided with a vehicle ID code and a vehicle transponder code and includes a key socket. The system includes an electronic key held by the user and insertable in the key socket. The electronic key selectively transmits a key ID code and a key transponder code to the vehicle. A first authentication unit, installable in the vehicle, checks whether or not the key ID code matches the vehicle ID code when the user with the electronic key enters the vehicle. A second authentication unit, installable in the vehicle, checks whether or not the key transponder code matches the vehicle transponder code when the user inserts the electronic key in the key socket. A control unit enables the starting of the engine and selectively interlocks the electronic key when inserted in the key socket in accordance with the results of the checking by the first and second authentication units. A notification unit notifies the user whether the electronic key is removable or irremovable from the key socket in accordance with the operation of the control unit.

Another aspect of the present invention is a system for controlling starting and stopping of an engine mounted on a vehicle for use by a user. The vehicle is provided with a vehicle ID code and a vehicle transponder code and includes a key socket. The system includes an electronic key held by the user and insertable in the key socket. The electronic key selectively transmits a key ID code and a key transponder code to the vehicle. A first authentication unit, installable in the vehicle, checks whether or not the key ID code matches the vehicle ID code when the user with the electronic key enters the vehicle. A second authentication unit, installable in the vehicle, checks whether or not the key transponder code matches the vehicle transponder code when the user inserts the electronic key in the key socket. A control unit enables the starting of the engine in accordance with the results of the checking by the first and second authentication units. A notification unit notifies the user whether the starting of the engine is enabled in accordance with the result of the checking by the first authentication unit or the result of the checking by the second authentication unit.

A further aspect of the present invention is a system for controlling starting and stopping of an engine mounted on a vehicle for use by a user. The vehicle is provided with a vehicle ID code and a vehicle transponder code and includes a key socket and an electric system. The system includes an electronic key held by the user and insertable in the key socket. The electronic key selectively transmits a key ID code and a key transponder code to the vehicle. A computer, installable in the vehicle, checks whether or not the key ID code matches the vehicle ID code when the user with the electronic key enters the vehicle and checks whether or not the key transponder code matches the vehicle transponder code when the user inserts the electronic key in the key socket. The computer enables the starting of the engine when two ID codes match or when the two transponder codes match. An operation unit operated by the user to set a functional position of the electric system in the vehicle and to start or stop the engine. The functional position includes an OFF position that stops supplying power to the electric system of the vehicle. An interlock device interlocks the electronic key inserted in the key socket when the starting of the engine is enabled in accordance with the checking of the transponder codes and the functional position is set to one other than the OFF position. A notification unit for notifying the user whether the electronic key is removable or irremovable from the key socket in accordance with the operation of the interlock device.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An engine start/stop control system 11 according to a preferred embodiment of the present invention will now be discussed with reference to the drawings.

Figure 1:
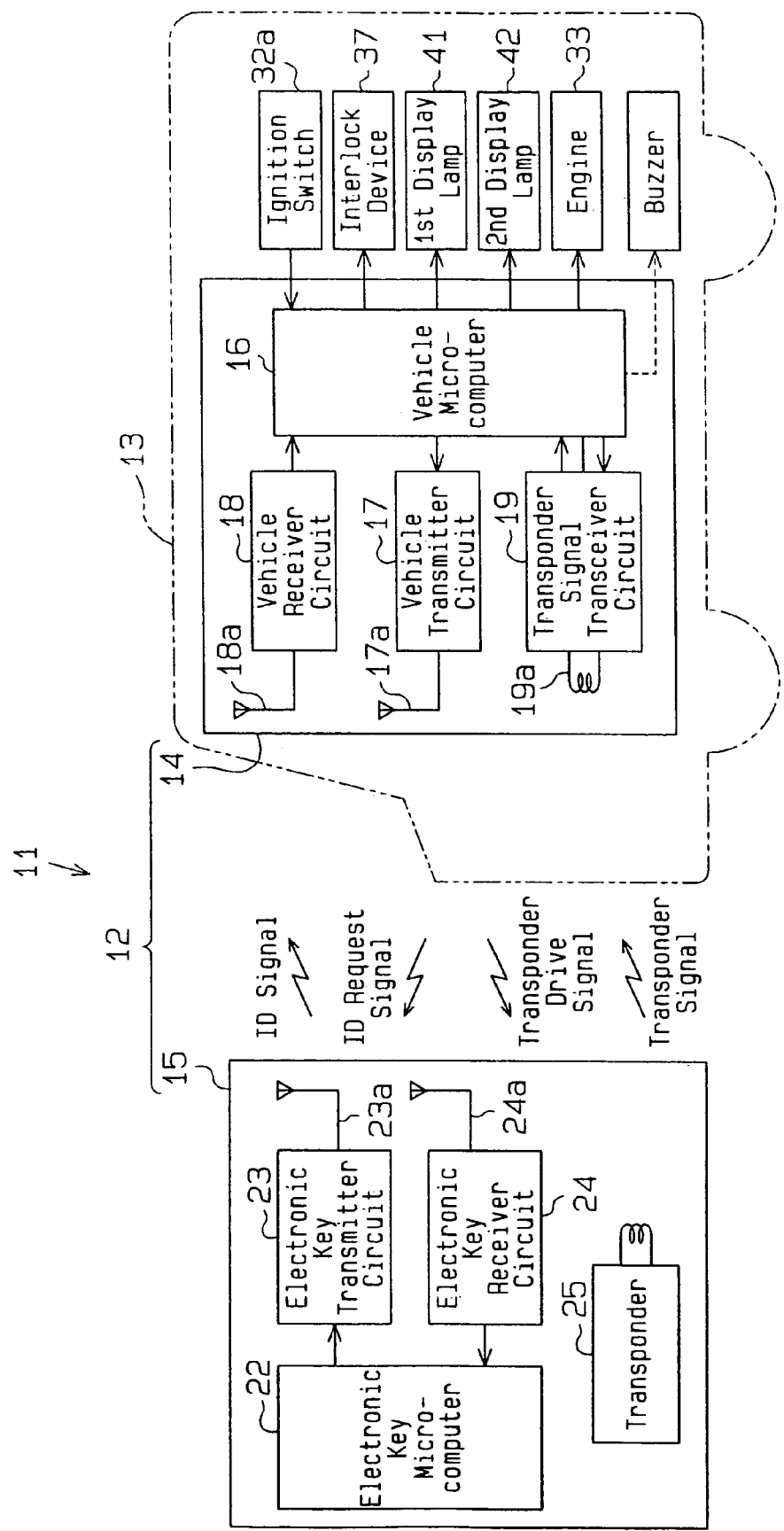
FIG. 1 is a schematic block diagram of an engine start/stop control system according to a preferred embodiment of the present invention.

Referring to FIG. 1, the control system 11 includes a communication device 12 that performs ID authentication through wireless communication. The communication device 12 includes a vehicle communicator 14, which is arranged in a vehicle 13, and an electronic key 15, which is held by the user of the vehicle 13. The vehicle communicator 14 transmits an ID request signal and a transponder drive signal. The electronic key 15 transmits an ID signal and a transponder signal.

The vehicle communicator 14 includes a vehicle microcomputer 16, a vehicle transmitter circuit 17, a vehicle receiver circuit 18, and a transponder signal transceiver circuit 19. The vehicle transmitter circuit 17, the vehicle receiver circuit 18, and the transponder signal transceiver circuit 19 are each connected to the vehicle microcomputer 16. The vehicle microcomputer 16 intermittently provides the vehicle transmitter circuit 17 with the ID request signal and provides the transponder signal transceiver circuit 19 with the transponder drive signal. The vehicle transmitter circuit 17 converts the ID request signal to a radio wave having a predetermined frequency and transmits the radio wave to a predetermined range in the vehicle 13 via an antenna 17a. The vehicle receiver circuit 18 receives the ID signal of the electronic key 15 via an antenna 18a. Furthermore, the vehicle receiver circuit 18 demodulates the ID signal to generate a received signal and provides the received signal to the vehicle microcomputer 16.

The transponder signal transceiver circuit 19 converts the transponder drive signal, which is provided from the vehicle microcomputer 16, to a radio wave having a predetermined frequency. Then, the transponder signal transceiver circuit 19 transmits the radio wave (transponder drive signal) within a predetermined range in the passenger compartment via a coil antenna 19a. The transponder signal transceiver circuit 19 also receives the transponder signal of the electronic key 15 via the coil antenna 19a. Furthermore, the transponder signal transceiver circuit 19 demodulates the transponder signal to a pulse signal to generate a received signal and provides the received signal to the vehicle microcomputer 16.

The vehicle microcomputer 16 includes a memory for storing an ID code that is unique to the vehicle, which is owned by the user. The vehicle microcomputer 16 compares the ID code stored in the memory with an ID code included in an ID signal transmitted from the electronic key 15 to determine whether the ID codes match.

Further, the vehicle microcomputer 16 compares a transponder ID code (hereinafter simply referred to as a "transponder code"), which is stored in the memory, with a transponder code included in a transponder signal provided from a transponder 25 of the electronic key 15 to determine whether the two transponder codes match.

The authentication of the ID code included in the ID signal by the vehicle microcomputer 16 is referred to as "smart ID authentication." The authentication of the transponder code included in the transponder signal is referred to as "transponder ID authentication."

The electronic key 15 includes an electronic key microcomputer (portable device microcomputer) 22. The electronic key microcomputer 22 receives the ID request signal transmitted from the vehicle microcomputer 16 and checks whether the ID request signal is the ID request signal of the user's vehicle 13. The electronic key 15 transmits the ID signal to the vehicle communicator 14 only when the received ID request signal is the ID request signal of the user's vehicle 13. The ID signal includes a unique code so that the user's electronic key 15 may be distinguished from electronic keys for other vehicles. The ID code is stored in a memory of the electronic key microcomputer 22.

More specifically, the electronic key 15 includes an electronic key transmitter circuit 23 and an electronic key receiver circuit 24, which are connected to the electronic key microcomputer 22. The electronic key microcomputer 22 provides the electronic key transmitter circuit 23 with the ID signal. The electronic key transmitter circuit 23 converts the ID signal provided from the electronic key microcomputer 22 to a radio wave having a predetermined frequency and transmits the radio wave as the ID signal via an antenna 23a. The electronic key receiver circuit 24 receives the ID request signal from the vehicle 13 via an antenna 24a, demodulates the ID request signal to a pulse signal to generate a received signal, and provides the received signal to the electronic key microcomputer 22. The electronic key microcomputer 22, the electronic key transmitter circuit 23, and the electronic key receiver circuit 24 use a battery (not shown) as a power supply.

The electronic key 15 includes the transponder 25. The transponder 25 is used during an emergency, such as when the battery, which is the power supply of the electronic key microcomputer 22, is drained or when there is an anomaly in the communication function. The transponder 25 transmits a transponder signal, which includes a transponder code unique to the user's vehicle 13 so that the electronic key 15 can be distinguished from electronic keys for other vehicles, to the vehicle controller 10.

The coil antenna 19a of the transponder signal transceiver circuit 19 forms a transponder drive signal range (electromagnetic field) in the vehicle 13. When the transponder 25 of the electronic key 15 enters the transponder drive signal range, induced electromotive force is generated in the transponder 25. The transponder 25 uses the induced electromotive force to transmit the transponder signal, which includes the transponder code, to the transponder signal transceiver circuit 19. In this manner, the electronic key 15 obtains power from the transponder 25 in addition to the battery (not shown).

Figure 2:
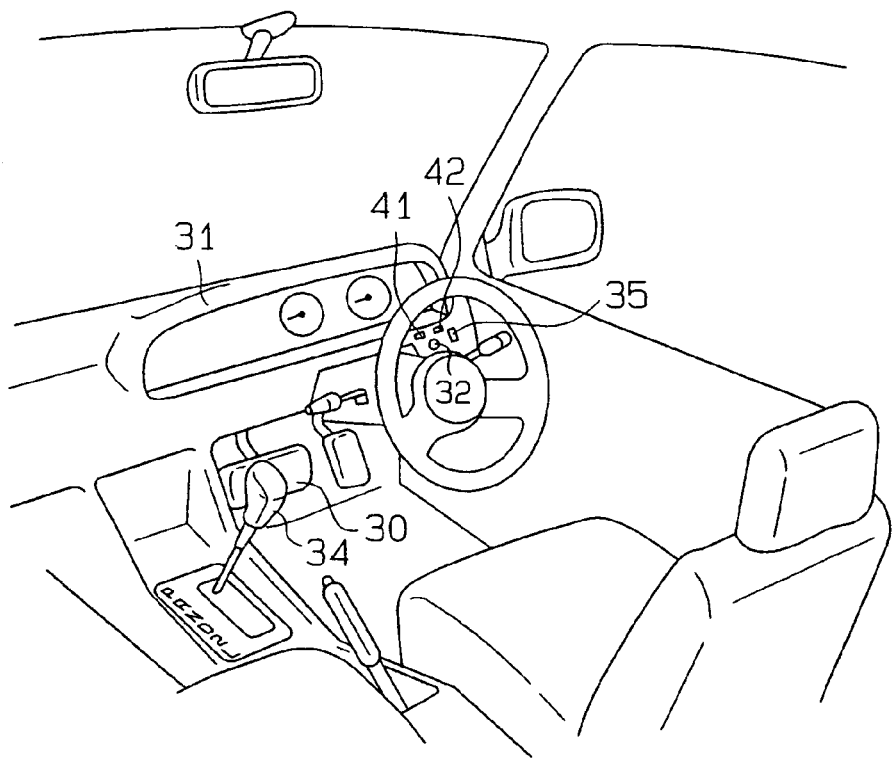
FIG. 2 is a perspective view showing the passenger compartment in which the control system of FIG. 1 is installed.

Referring to FIGS. 1 and 2, a push button 32, which is operated to start or stop the engine, is arranged on the surface of the instrument panel 31 in the passenger compartment. When the push button 32 is operated, an ignition switch 32a, which is connected to an input terminal of the vehicle microcomputer 16, is activated or inactivated. The activation of the ignition switch 32a provides the vehicle microcomputer 16 with an operation signal.

In a state in which the engine 33 is running, when a gearshift lever 34 is arranged at a parking position in the passenger compartment and the ID code or transponder code transmitted from the electronic key 15 matches the corresponding code stored in the vehicle microcomputer 16, the operation of the push button 32 stops the engine. When the engine 33 stops running, the engine 33 is started again by depressing a brake pedal 30 in the passenger compartment and operating the push button 32. When the engine of the vehicle 13 is not running and the push button 32 is operated without depressing the brake pedal 30, the functional position is sequentially switched from OFF to an ACC (accessory) system and then to an ON (ignition ON) system to switch electric systems in the vehicle 13.

A key socket 35 is arranged in the vicinity of the push button 32 in the surface of the instrument panel 31. When part of the electronic key 15 is inserted in the key socket 35, the transponder 25 of the electronic key 15 is located in the transponder drive signal range formed by the coil antenna 19a of the transponder signal transceiver circuit 19.

An interlock device (holding unit) 37 is arranged in the key socket 35. The interlock device 37 is connected to the output terminal of the vehicle microcomputer 16 and controlled by the vehicle microcomputer 16. More specifically, when the electronic key 15 is inserted in the key socket 35 and smart ID authentication is performed, the vehicle microcomputer 16 controls the interlock device 37 so that the removal of the electronic key 15 from the key socket 35 is enabled. When the electronic key 15 is inserted in the key socket 35 and transponder ID authentication is performed, the vehicle microcomputer 16 controls the interlock device 37 so that the removal of the electronic key 15 from the key socket 35 is disabled. In other words, the interlock device 37 interlocks the electronic key 15.

The main features of the preferred embodiment will now be discussed.

A first display lamp 41 and a second display lamp 42 (notification unit) are arranged in the instrument panel 31 near the push button 32 to notify the user whether or not the electronic key 15 is removable from the key socket 35. The first display lamp 41 and the second display lamp 42 are arranged in front of the steering wheel near instruments such as the speedometer. The first and second display lamps 41 and 42 may be located at any positions as long as they can be viewed by the user.

Figure 3:
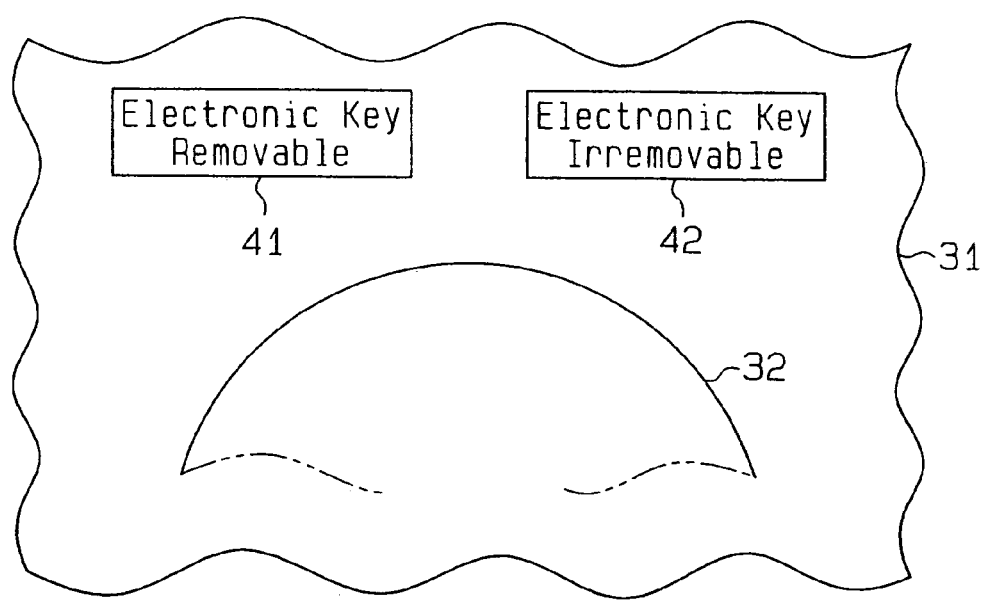
FIG. 3 is a schematic diagram showing a first display lamp and a second display lamp of the control system of FIG. 1.

The first display lamp 41 notifies the user that the electronic key 15 is removable from the key socket 35, or that smart ID authentication was performed. In the preferred embodiment, the first display lamp 41 displays a message stating "electronic key removable" as shown in FIG. 3. The second display lamp 42 notifies the user that the electronic key 15 is irremovable from the key socket 35, or that transponder ID authentication was performed. In the preferred embodiment, the second display lamp 42 displays a message stating "electronic key irremovable" as shown in FIG. 3. To illuminate the first and second display lamps 41 and 42, for example, a light emitting diode (LED), an organic or inorganic electroluminescence (EL) device, or a liquid crystal display (LCD) may be used.

The first display lamp 41 and the second display lamp 42 are illuminated in different colors. The first display lamp 41 is illuminated in green, and the second display lamp 42 is illuminated in red. However, the first and second display lamps 41 and 42 may be illuminated in any color as long as they are illuminated in different colors.

The first display lamp 41 and the second display lamp 42 are connected to the output terminal of the vehicle microcomputer 16 and controlled so that only one of the first and second display lamps 41 and 42 is illuminated. More specifically, after smart ID authentication is performed, when the electronic key 15 is inserted in the key socket 35 and the functional position of the electric system of the vehicle 13 is set to the ACC system or the ON system, the vehicle microcomputer 16 illuminates only the first display lamp 41. If the electronic key 15 is inserted in the key socket 35 to perform transponder ID authentication and the functional position of the electric system of the vehicle 13 is set to the ACC system or the ON system, the vehicle microcomputer 16 illuminates only the second display lamp 42.

The operation of the engine start/stop control system 11 will now be discussed.

[Normal State]

When the battery incorporated in the electronic key 15 is not drained, the smart ID authentication enables the starting of the engine 33. That is, when the electronic key 15 held by the user enters the communication range of the ID request signal that is output from the vehicle transmitter circuit 17, the electronic key microcomputer 22 transmits the ID signal to the vehicle 13 in response to the ID request signal from the vehicle communicator 14. When receiving the ID signal from the electronic key 15, the vehicle microcomputer 16 compares the ID code of the electronic key 15 that is included in the ID signal with the predetermined ID code of the vehicle 13. When determining that the two ID codes match, the vehicle microcomputer 16 validates the operation of the push button 32.

In a state in which the engine 33 is stopped, when the user depresses the brake pedal 30 and operates the push button 32, the vehicle microcomputer 16 is provided with an operation signal. In response to the operation signal, the vehicle microcomputer 16 starts the engine 33. In a state in which the engine 33 is running and the gearshift lever 34 is arranged at the parking position, when the user operates the push button 32, the vehicle microcomputer 16 stops the engine 33.

After the smart ID authentication is performed, when the push button 32 is operated to set the functional position of the electric system in the ACC system or the ON system, the user may insert the electronic key 15 in the key socket 35 for one reason or another. In such a case, the vehicle microcomputer 16 illuminates the first display lamp 41 without driving the interlock device 37. This notifies the user that the electronic key 15 is removable from the key socket 35, or that smart ID authentication has been performed.

[Drained Battery State]

When the electronic key 15 does not transmit the ID signal due to, for example, a decrease in the battery voltage of the electronic key 15 or a communication anomaly, the user inserts part of the electronic key 15 into the key socket

35. In this state, the transponder 25 is in the range in which the transponder drive signal of the transponder signal transceiver circuit 19 is receivable. Thus, induced electromotive force is generated in the transponder 25, and the electronic key 15 transmits the transponder signal to the vehicle 13. When receiving the transponder signal from the electronic key 15, the vehicle microcomputer 16 compares the transponder code of the electronic key 15 included in the transponder signal with the predetermined transponder code of the vehicle 13. When the two ID codes match, the vehicle microcomputer 16 validates the operation of the push button 32 and drives the interlock device 37 so that the electronic key 15 is interlocked and cannot be removed from the key socket 35.

In a state in which the engine 33 is stopped, when the user depresses the brake pedal 30 and operates the push button 32, the vehicle microcomputer 16 is provided with the operation signal. In response to the operation signal, the microcomputer 16 starts the engine 33. In a state in which the engine 33 is running and the gearshift lever 34 is arranged at the parking position, when the user operates the push button 32, the vehicle microcomputer 16 stops the engine 33. Further, the vehicle microcomputer 16 drives the interlock device 37 to release and enable removal of the electronic key 15.

After the transponder ID authentication, when the push button 32 is operated to switch the functional position of the electric system to the ACC system or the ON system, the vehicle microcomputer 16 illuminates the second display lamp 42. This notifies the user that the electronic key 15 is irremovable from the key socket 35, or that transponder ID authentication has been performed.

The advantages of the engine start/stop system 11 of the preferred embodiment will now be discussed.

(1) When the user inserts the electronic key 15 into the key socket 35 for one reason or another even though smart ID authentication has been performed and the starting of the engine 33 is enabled, the first display lamp 41 is illuminated. By looking at the first display lamp 41, the user may confirm that the electronic key 15 is removable from the key socket 35. Accordingly, the user would not erroneously determine that the engine start/stop control system 11 is functioning improperly or be confused even if the electronic key 15 is removable from the key socket 35 when the user does not think so.

(2) The illumination of the first display lamp 41 enables the user to confirm that smart ID authentication has been performed, and the illumination of the second display lamp 42 enables the user to confirm that transponder ID authentication has been performed. Thus, the user would not erroneously determine that the engine start/stop control system 11 is functioning improperly or be confused even if the electronic key 15 is removable from the key socket 35 when the user does not think so.

(3) After the transponder ID authentication, the second display lamp 42 is illuminated when the operation of the push button 32 switches the functional position of the electric system to the ACC system or the ON system. By looking at the second display lamp 42, the user may confirm that the electronic key 15 is irremovable from the key socket 35. Accordingly, the user would not erroneously determine that the engine start/stop control system 11 is functioning improperly or be confused even if the electronic key 15 is removable from the key socket 35 when the user does not think so.

It should be apparent to those skilled in the art that the present invention may be embodied in many other specific forms without departing from the spirit or scope of the invention. Particularly, it should be understood that the present invention may be embodied in the following forms.

The color of the light emitted from the illuminating means, such as an LED, may differ between the first display lamp 41 and the second display lamp 42.

In the preferred embodiment, the first display lamp 41 and the second display lamp 42 are illuminated in different colors. However, the first and second display lamps 41 and 42 may be illuminated in the same color.

In the preferred embodiment, the first and second display lamps 41 and 42 are illuminated to show messages. However, messages indicating whether or not the electronic key 15 is removable from the key socket 35 may be shown, for example, on the display of a car navigation system.

In the preferred embodiment, the first display lamp 41 and the second display lamp 42 are used as the notification unit. In lieu of the first and second display lamps 41 and 42, for example, a notification buzzer or a speaker, which generates a voice message, may be connected to the output terminal of the vehicle microcomputer 16 for use as the notification unit. In this case, the sound generated from the notification buzzer or the speaker notifies the user whether or not the electronic key 15 is removable from the key socket 35. As another option, the first and second display lamps 41 and 42 may be used in combination with a notification unit that generates sound as described above.

In the preferred embodiment, the user inserts part of the electronic key 15 in the key socket 35 to perform transponder ID authentication. However, instead of inserting just part of the electronic key 15, the whole electronic key 15 may be inserted in the key socket 35.

The present examples and embodiments are to be considered as illustrative and not restrictive, and the invention is not to be limited to the details given herein, but may be modified within the scope and equivalence of the appended claims.

What is claimed is:

1. A system for controlling starting and stopping of an engine mounted on a vehicle for use by a user, wherein the vehicle is provided with a vehicle ID code and a vehicle transponder code and includes a key socket, the system comprising:

an electronic key held by the user and insertable in the key socket, the electronic key selectively transmitting a key ID code and a key transponder code to the vehicle;

a first authentication unit installable in the vehicle for checking whether or not the key ID code matches the vehicle ID code when the user with the electronic key enters the vehicle;

a second authentication unit installable in the vehicle for checking whether or not the key transponder code matches the vehicle transponder code when the user inserts the electronic key in the key socket;

a control unit for enabling the starting of the engine and selectively interlocking the electronic key when inserted in the key socket in accordance with the results of said checking by the first and second authentication units; and a notification unit for notifying the user whether the electronic key is removable or irremovable from the key socket in accordance with the operation of the control unit;

wherein the notification unit notifies the user that the key is removable when the checking by the first authentication unit is performed and notifies the user that the key is irremovable when the checking by the second authentication unit is performed.

2. The system according to claim 1, wherein the notification unit notifies the user that the electronic key is irremovable from the key socket when the starting of the engine is enabled in accordance with the result of said checking by the second authentication unit.

3. The system according to claim 1, wherein the notification unit includes at least one of a display lamp and a buzzer.

4. The system according to claim 1, wherein the notification unit includes:
   a first display lamp illuminated in a first color when the electronic key is removable from the key socket; and
   a second display lamp illuminated in a second color differing from the first color when the electronic key is irremovable from the key socket.

5. A system for controlling starting and stopping of an engine mounted on a vehicle for use by a user, wherein the vehicle is provided with a vehicle ID code and a vehicle transponder code and includes a key socket, the system comprising:
   an electronic key held by the user and insertable in the key socket, the electronic key selectively transmitting a key ID code and a key transponder code to the vehicle;
   a first authentication unit installable in the vehicle for checking whether or not the key ID code matches the vehicle ID code when the user with the electronic key enters the vehicle;
   a second authentication unit installable in the vehicle for checking whether or not the key transponder code matches the vehicle transponder code when the user inserts the electronic key in the key socket;
   a control unit for enabling the starting of the engine and selectively interlocking the electronic key when inserted in the key socket in accordance with the results of said checking by the first and second authentication units; and
   a notification unit for notifying the user that the starting of the engine is enabled and the key is removable when the checking by the first authentication unit is performed and notifies the user that the starting of the engine is enabled and the key is irremovable when the checking by the second authentication unit is performed.

6. A system for controlling starting and stopping of an engine mounted on a vehicle for use by a user, wherein the vehicle is provided with a vehicle ID code and a vehicle transponder code and includes a key socket and an electric system, the system composing:
   an electronic key held by the user and insertable in the key socket, the electronic key selectively transmitting a key ID code and a key transponder code to the vehicle;
   a computer installable in the vehicle for checking whether or not the key ID code matches the vehicle ID code when the user with the electronic key enters the vehicle and for checking whether or not the key transponder code matches the vehicle transponder code when the user inserts the electronic key in the key socket, the computer enabling the starting of the engine when two ID codes match or when the two transponder codes match;
   an operation unit operated by the user to set a functional position of the electric system in the vehicle and to start or stop the engine, the functional position including an OFF position that stops supplying power to the electric system of the vehicle;
   an interlock device for interlocking the electronic key inserted in the key socket when the starting of the engine is enabled in accordance with the checking of the transponder codes and the functional position is set to one other than the OFF position; and
   a notification unit for notifying the user whether the electronic key is removable or irremovable from the key socket in accordance with the operation of the interlock device;
   wherein the notification unit notifies the user that the key is removable when the checking of the ID codes is performed and notifies the user that the key is irremovable when the checking of the transponder codes is performed.

7. The system according to claim 6, wherein the notification unit includes:
   a first display lamp illuminated when the starting of the engine is enabled in accordance with the checking of the ID codes and the functional position is set to one other than the OFF position, the first display lamp notifying the user that the electronic key is removable from the key socket; and
   a second display lamp illuminated when the starting of the engine is enabled in accordance with the checking of the transponder codes and the functional position is set to one other than the OFF position, the second display lamp notifying the user that the electronic key is irremovable from the key socket.

* * * * *

UNITED STATES PATENT AND TRADEMARK OFFICE
CERTIFICATE OF CORRECTION

PATENT NO.        : 7,262,683 B2                                      Page 1 of 1
APPLICATION NO.   : 10/899490
DATED             : August 28, 2007
INVENTOR(S)       : Toru Maeda It is certified that error appears in the above-identified patent and that said Letters Patent is hereby corrected as shown below:

Column 9
Line 50, delete "composing:" and insert therefor -- comprising: --.

Signed and Sealed this

Twenty-fifth Day of March, 2008

JON W. DUDAS
*Director of the United States Patent and Trademark Office*